Aug. 29, 1939.   G. T. LAMPTON   2,170,865
PROPELLER BLADE
Filed Nov. 13, 1937   2 Sheets-Sheet 1
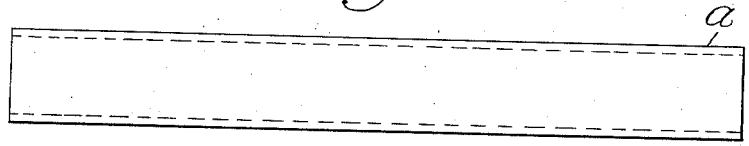
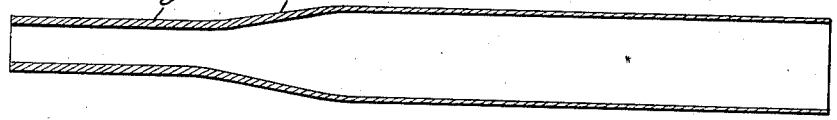
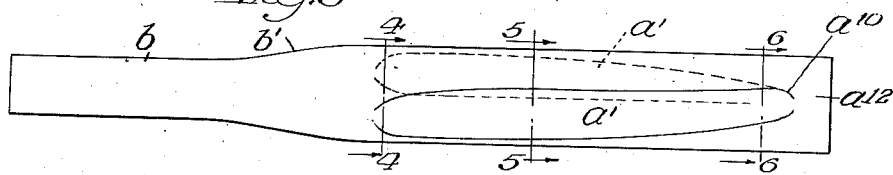
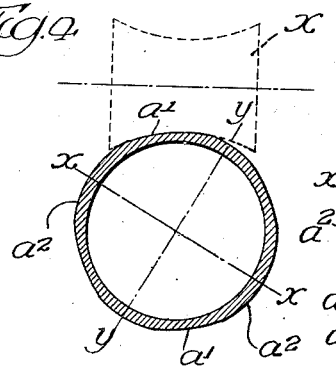
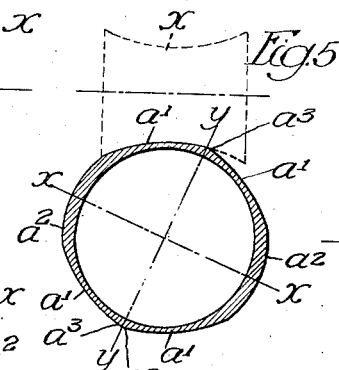
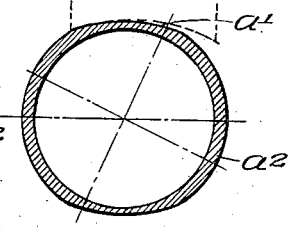
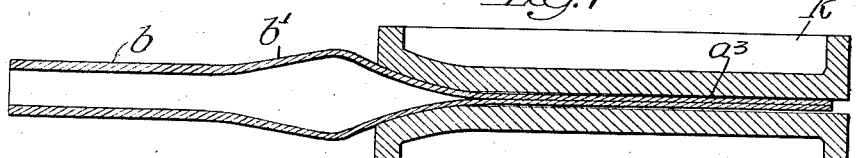
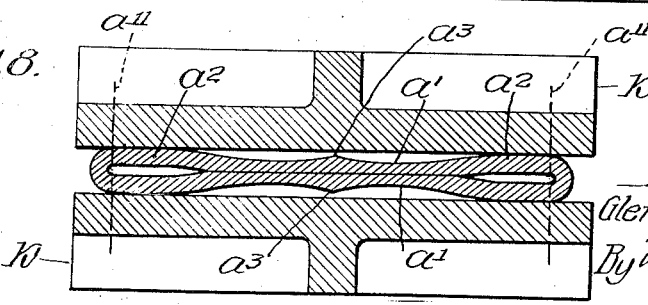
Inventor
Glen T. Lampton

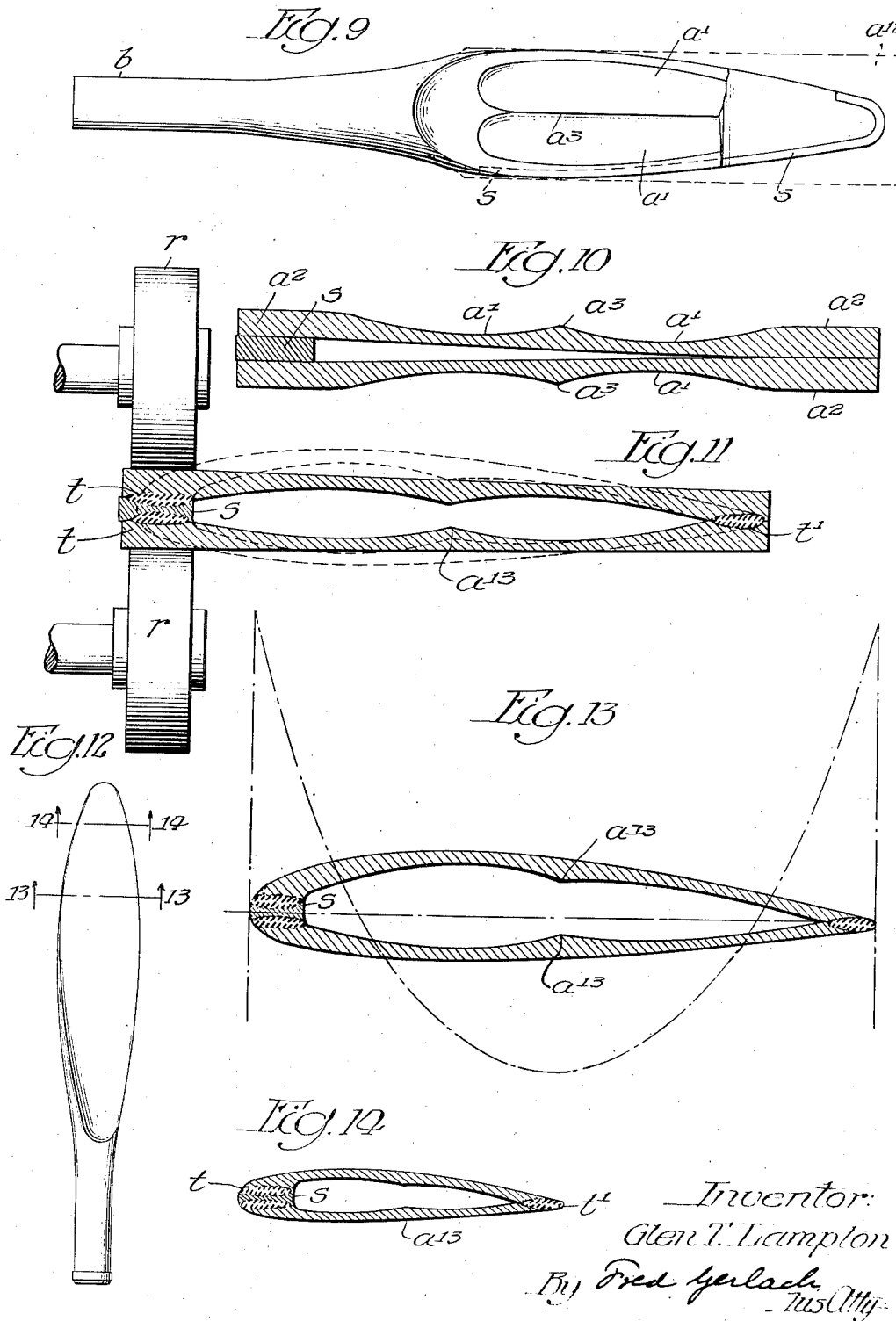

Patented Aug. 29, 1939

2,170,865

UNITED STATES PATENT OFFICE 2,170,865

PROPELLER BLADE

Glen T. Lampton, Williamsport, Pa., assignor to Aviation Manufacturing Corporation, Williamsport, Pa., a corporation of Delaware Application November 13, 1937, Serial No. 174,377

20 Claims. (Cl. 170—159)

The invention relates to hollow steel propeller-blades.

The objects of the invention are to provide a steel hollow propeller-blade which: is formed of a steel alloy which has the desired characteristics for efficient union of the blade-sections by resistance-welding at the leading and trailing edges of the blade where the stresses in the blade are highest during use, for rendering the blade comparatively insensitive to fatigue under heavy loads and for resistance to heavy abrasion, scratches or nicks which often constitute the source of failure in use; has the inner faces of its camber and pressure-sections welded together to provide a greater and more effective union of the sections at the leading and trailing edges with a concomitant increase of strength and endurance resulting therefrom, in lieu of a weld across the edges of the face-sections, as heretofore proposed; has the marginal portions of both of its face-sections of full wall-thickness and intermediate portions of reduced wall-thickness for strength and lightness; has its face-sections with leading and trailing edges of the maximum wall-thickness and reduced wall-thickness intermediate the marginal portions of both faces, with a somewhat greater wall-thickness along mid-chord lines, for resistance to the transverse moments to which the faces are subjected.

Other objects of the invention will appear from the detail description.

The invention consists in the several novel features which are hereinafter set forth and are more particularly defined by claims at the conclusion hereof.

In the drawings: Fig. 1 is a side elevation of a tubular blank from which the blade is formed. Fig. 2 is a longitudinal section of the blank after it has been swaged, reduced in diameter and upset to provide an adequate wall-thickness for its tubular shank or inner end which is attached to the hub of the propeller. Fig. 3 is a side elevation of the blank after portions thereof have been milled or cut away to provide the desired wall-thickness in different portions of the faces of the blade. Fig. 4 is a section taken on line 4—4 of Fig. 3. Fig. 5 is a section taken on line 5—5 of Fig. 3. Fig. 6 is a section taken on line 6—6 of Fig. 3. Fig. 7 is a longitudinal section illustrating the flattening of the tubular blank in a press preparatory to forming the face-sections of the blade. Fig. 8 is a transverse section of the flattened blank in the press. Fig. 9 is a plan of the blank illustrating the portion cut off in forming the face-sections of the blade. Fig. 10 is a cross-section illustrating the face-sections with a strip between the leading edges for forming, with the face-sections, the leading edge of the blade. Fig. 11 is a transverse section showing the welded joints for the face-sections of the flattened blank. Fig. 12 is a perspective of the finished blade. Fig. 13 is a transverse section of the finished blade on line 13—13 of Fig. 12. Fig. 14 is a cross-section of the finished blade on line 14—14 of Fig. 12.

The propeller is formed of a seamless tubular blank $a$ of a steel alloy made from substantially the following formula:

|  | Per cent |
|---|---|
| Carbon | .25 to .35 |
| Manganese | .30 to .50 |
| Chromium | .50 to .80 |
| Nickel | 1.50 to 2.00 |
| Molybdenum | .30 to .40 |
| Phosphorus, maximum | .04 |
| Sulphur, maximum | .05 |
| Iron | Remainder |

The carbon range of this steel alloy makes it a medium carbon steel. The relatively low carbon and manganese condition improves the response of the metal to resistance-welding. This provides a steel alloy in which the low carbon content is offset by the chromium, nickel and molybdenum content and provides high physical characteristics after die-quenching of the steel. Specimens of this steel, under test, have shown an ultimate tensile strength of as high as 250,000 lbs. per square inch, which may be easily tempered to a final ultimate tensile strength of 175,000 lbs. per square inch. An important attribute of this steel alloy is its high ratio of fatigue limit to ultimate tensile strength which is essential in propeller-blades operated at high speeds. A further important characteristic of the blades made of this steel alloy is its comparative insensitivity to fatigue limit and notch effects, which is a desideratum in propeller-blades because they are subjected to heavy abrasion, scratches and nicks which, in actual use under high fatiguing loads, often form the source of failures in blades as heretofore made. The finished blade formed of this steel alloy exemplifies a medium carbon steel which has a relatively low carbon content and contains the requisite portions of nickel, chromium and molybdenum. This adapts the alloy for efficient resistance-welding and for a propeller-blade having an ultimate tensile strength of 175,000 lbs. per square inch.

In resistance-welding, the blade-sections are subjected to pressure between rolls which carry an electrical potential. The sections of the blank that lie between the rolls at any time complete a circuit between the rolls. The direct short circuit that exists at any point between the rolls, produces a high temperature at these points. The potential impressed between the rolls is such that the temperature existing at the points is sufficiently high to cause fusion under the action of the pressure of the rolls and a welded area results, as hereinafter described. The success of the weld depends generally on a reduced resistance to current flow through the main layers of the joint and an increased resistance at the point where the layers are in contact. The weld is better as the contacting surfaces of the built-up section become closer to each other. In order to achieve a successful weld of this type, it is important that the material be such that the possibility of local shrinkage in the area of the weld be minimized. The low percentage of carbon and manganese in the steel alloy herein contemplated tends to achieve this result.

The improved blade is made from a tubular blank $a$ of the aforesaid steel alloy (Fig. 1) which is reduced in diameter by swaging to form a cylindrical shank $b$ (Fig. 2) at one end thereof and an intermediate portion $b'$ of gradually increasing diameter, extending from the shank to approximately mid-length of the blank, the shank $b$ being upset in axial direction to provide adequate wall-thickness for attachment of the shank to the hub.

Next, the peripheral portions of the wall of the blank are relieved or cut away by four successive milling operations with a concave cutter $x$. One pair of contiguous cuts are successively made on the cylindrical blank along longitudinally extending zones of the blank to form zones $a'$ of reduced wall-thickness and the other pair of cuts are similarly made to form similar diametrically opposite zones. Each cut commences longitudinally at the portion of the blank used for the inner end of a blade-face and is produced by relative rotary and longitudinal movement of the cutter and blank to gradually enter the blank to a maximum depth at mid-length of the face and then to be maintained at that depth or slightly increased depth to a point near the tip, if it is desired to gradually reduce the wall-thickness longitudinally toward the tip. Each contiguous pair is curved circumferentially towards each other, as at $a^{10}$, so that the relieved portions will merge together at the tip. The diametrically opposite portions $a^2$ of the blank are of substantially full wall-thickness for forming the leading and trailing edges of the blade. The cuts form longitudinally extending ridges or portions $a^3$ mid-chord of the blade-faces, between portions $a'$ of reduced thickness and between the trailing and leading edges and the mid-chord portions of each of the blade-faces. The portions $a^2$ of full thickness are used to form the leading and trailing edges of the blade. The ridges $a^3$ between the portions $a'$ provide a greater longitudinally-extending wall-thickness mid-chord of the pressure and camber faces of the blade. This provides adequate wall-thickness and area for welds between the inner faces of blade-sections at the leading and trailing edges of the blade, an integral ridge along the longitudinal center of the camber and pressure-faces, and reduced wall-thickness intermediate the edges of the face-sections and the ridge for the completion of the blades.

Next, the blank is flattened between a pair of dies $k$ preparatory to forming the airfoil portion of the blade. The blank may be heated below recalescence and is positioned in these dies so that the centers of the diametrically opposite portions $a^2$ of full wall-thickness will be located on the line where the blank is to be folded (Fig. 8), so the ridge $a^3$ will be located mid-way between the portions $a^2$ and the relieved portions $a'$ will be between said ridge and the portions $a^2$. The wall-portions $a^2$ will be folded along their transverse center so that the edge-portions of the flattened blank will be of two thicknesses of the metal. The blank is flattened to facilitate its formation into sections for forming the blade-faces.

When removed from the dies $k$, the plan-form of the blank will be of the contour shown by dotted lines in Fig. 9. The edges of both of the folds of the flattened portions of the blank are then trimmed therefrom by sawing or cutting, on lines $a^{11}$ in Fig. 8, so as to leave the shape shown in full lines in Fig. 9. This severs the folded edges and the tip-portions $a^{12}$ from the blank and produces a tubular blank with a bifurcated portion for two sections which are adapted to be shaped to form the camber and the pressure faces of the blade. When the blade has been thus flattened, each of its face-sections will have a maximum wall-thickness at its margins to provide adequate thickness and area for joining them together to form the leading and trailing edges, by resistance-welding.

Next, the face-sections will be spread apart and a flat strip $s$ formed of the same metal as the blade will be inserted in the gap between said sections around the leading edge and tip of the blades. This strip is curved to conform to the edge of the blade from the tip to the tubular portion $b'$, tapers in thickness longitudinally, and is of sufficient width to provide ample weld-area for joining the face-sections together by lap-welds. A characteristic of performing the welding with the blank, as described, is that the inner faces of the face-sections at the trailing edge lap each other so that their faces can be lap-welded together and the inner faces of the face-sections lap the contiguous faces of the strip $s$ so that they can be welded to the strip to form the leading edge of the blade by lap-welding. This provides a more efficient weld and greater welding area than is possible with edge-welding. In welding the face-sections together, their margins are passed between welding-rolls $r$ and the welding produced is of the type known as "resistance-welding." In this process, both the joint built up of the two blank faces and the insert strip $s$ and the trailing edge joint, are successively subjected to pressure between the rolls $r$. The rolls are applied at the inner ends of the faces and worked towards the tip to cause any excess of metal in the joints to flow toward the tip, where it can be removed. These rolls carry an electrical potential. The section of the blank that lies between the rolls at any time completes a circuit between the rolls. The direct short circuit that exists between the rolls produces a high temperature at these joints. The potential impressed between the rolls is such that the temperature existing at the joints is sufficiently high to cause fusion under the action of the pressure of the rolls and a welded area results, such as shown at $t$ in Fig. 11. The weld is better as the contacting faces of the built-up section become closer to each other. In order to achieve a successful weld of this type, it is important that the material be such that the possibility of local shrinkage in the area of the weld be minimized. The low percentage of carbon and manganese in the steel alloy herein contemplated tends to achieve this result. Since the welds are accomplished in this process at the leading and trailing edges of the blades where the stresses in the blades are highest during use, the formation of the leading and trailing edges by a lap resistance-weld produces a blade that is rendered highly resistant to rupture or failure in high speed operation. The weld-joints are of greater area than is possible when the weld is formed between the edges of the steel-sections.

Next, the welded blank is heated and placed between shaping dies having cavities which correspond substantially to the airfoil section of the finished blade desired. The mating halves of the dies are shaped so that the face-sections will be deformed or expanded into the desired airfoil section when the dies are brought together, by the admission of a supply of compressed inert gas. During the expansion of the welded blank to airfoil contour, the relieved portions on the outer faces of the face-sections are forced against the die-faces so that the outer faces will become smooth, with the protuberance from the mid-chord wall-thickness on the inside-faces of the face-sections, as illustrated in Figs. 13 and 14. In this manner, the face-sections are provided with this greater wall-thickness without projections on the outer faces of the blade.

Next, the leading and trailing edges are finished to the desired airfoil contour, as shown in Figs. 12, 13 and 14, and the blades tempered or otherwise treated to produce the desired physical properties in the metal of the blade, and then polished.

In use, the airfoil section of the blade is subjected to transverse moments as diagrammatically indicated by dotted lines in Fig. 13 and the longitudinally extending mid-chord portions of the face-sections are subjected to opposite transverse moments, the maximum values of which occur at approximately the longitudinally extending ridges $a^3$ or mid-chord points or greater wall-thickness than wall-portions between said points and the edges of the blade of the face-sections. The greater wall-thickness at these ridges serves to strengthen the blades against such moments and makes it possible to lighten the portions between the ridges and the leading and trailing edges.

The invention exemplifies a hollow propeller-blade in which the leading and trailing edges are formed by resistance-welding of the inner faces of the sections forming the pressure and camber-faces of the blades to render the blade comparatively insensitive to fatigue under heavy loads and for resistance to heavy abrasion, scratches or nicks and which is formed of a steel alloy which contributes to those desirable properties. It also exemplifies a hollow steel propeller-blade in which the face-sections of the blade at mid-chord points are provided with a greater wall-thickness than the portions intermediate the edges and said points, for high resistance to the transverse moments to which the mid-chord portions of the blade are subjected. It also exemplifies a hollow steel propeller-blade formed of a steel al'oy which, when tempered, has an approximate final ultimate tensile strength of 175,000 pounds per square inch which gives the blade a high ratio of fatigue limit to ultimate tensile strength, as is essential in propeller-blades operated at high speeds.

The characteristic attribute of the blade which has the inner faces of its face-sections joined by resistance-welding is that an autogenous joint is formed directly between the inner faces of the sections or with the outer faces of the strip $s$. This results in the faces being joined and in leading and trailing edges without the use of a flux or a separate fusible rod. When a separate flux or fusible rod is used in the joint, oxides are formed and gases are occluded, which results in non-uniformity in the joints or defects.

Another characteristic of the improved blade is that the weld areas at the trailing and leading edges extend over an area greater than the wall-thickness of the face-sections to form leading and trailing edges of great strength.

The propeller-blade claimed in this application is directed to the article produced by the methods disclosed in applicant's co-pending applications, Serial Numbers 34,669, 126,390, 175,782.

The invention is not to be understood as restricted to the details set forth, since these may be modified within the scope of the appended claims, without departing from the spirit and scope of the invention.

Having thus described the invention, what I claim as new and desire to secure by Letters Patent is:

1. A hollow propeller-blade formed of medium carbon steel containing nickel, chromium and molybdenum and comprising a tubular shank and face-sections having their margins joined by resistance-welding at their leading and trailing edges.

2. A hollow propeller-blade formed of medium carbon steel containing nickel, chromium and molybdenum and comprising an integral tubular shank and face-sections having their margins joined by resistance-welding at their leading and trailing edges.

3. A hollow steel propeller-blade formed of medium carbon steel containing approximately .50 to .80% chromium, 1.50 to 2.00% nickel, and .30 to 40% molybdenum and comprising a tubular shank and face-sections joined at their margins and having a final ultimate tensile strength of approximately 175,000 pounds per square inch.

4. A hollow steel propeller-blade formed of medium carbon steel containing approximately .50 to .80% chromium, 1.50 to 2.00% nickel, and .30 to .40% molybdenum and comprising a tubular shank and face-sections joined at their margins by resistance-welding and having a final ultimate tensile strength of approximately 175,000 pounds per square inch.

5. A hollow steel propeller-blade formed of medium carbon steel containing approximately .50 to .80% chromium, 1.50 to 2.00% nickel, and .30 to .40% molybdenum and comprising an integral tubular shank and face-sections joined at their margins by resistance-welding and having a final ultimate tensile strength of approximately 175,000 pounds per square inch.

6. A hollow steel propeller-blade comprising a tubular shank with integral face-sections having their marginal portions welded together to form leading and trailing edges, one of the face-sections having both of its marginal portions of substantially the same wall-thickness and a longitudinally extending zone of reduced wall-thickness between its marginal portions.

7. A hollow steel propeller-blade comprising a tubular shank with integral face-sections having their marginal portions welded together to form leading and trailing edges, each face-section having both of its marginal portions of substantially the same wall-thickness and a longitudinally extending zone of reduced wall-thickness between its marginal portions.

8. A hollow steel propeller-blade comprising a tubular shank with integral face-sections having their marginal portions welded together to form leading and trailing edges, one of the face-sections having both of its marginal portions of substantially the same wall-thickness and having a longitudinally extending zone cut away to reduce the wall-thickness between the marginal portions.

9. A hollow steel propeller-blade comprising a tubular shank with integral face-sections having their marginal portions welded together to form leading and trailing edges, each face-section having both of its marginal portions of substantially the same wall-thickness and having a longitudinally extending zone cut away to reduce the wall-thickness between the marginal portions.

10. A hollow steel propeller-blade comprising a tubular shank with integral face-sections having their marginal portions welded together to form leading and trailing edges, one of the face-sections having both of its marginal portions of substantially the same wall-thickness, and a longitudinally extending portion of reduced wall-thickness between its marginal portions, with greater wall-thickness along the mid-chord line.

11. A hollow steel propeller-blade comprising a tubular shank with integral face-sections having their marginal portions welded together to form leading and trailing edges, each face-section having both of its marginal portions of substantially the same wall-thickness, and a longitudinally extending portion of reduced wall-thickness between its marginal portions, with greater wall-thickness along the mid-chord line.

12. A hollow steel propeller-blade comprising a tubular shank with integral face-sections having their marginal portions welded together to form leading and trailing edges, one of the face-sections having both of its marginal portions of substantially the same wall-thickness and having a longitudinally extending portion cut away between its marginal portions to reduce the wall-thickness with greater wall-thickness along its mid-chord line.

13. A hollow steel propeller-blade comprising a tubular shank with integral face-sections having their marginal portions welded together to form leading and trailing edges, each face-section having both of its marginal portions of substantially the same wall-thickness and having a longitudinally extending portion cut away between its marginal portions to reduce the wall-thickness with greater wall-thickness along its mid-chord line.

14. A hollow steel aircraft propeller plade comprising a tubular shank and face-sections having their outer faces of airfoil contour, the face-sections having, at one of their margins, autogenously joined parallel contiguous inner faces, the outer faces of the joined marginal portions being shaped to form an airfoil edge of the blade.

15. A hollow steel aircraft propeller blade comprising a tubular shank and face-sections having their outer faces of airfoil contour, the face-sections having, at one of their margins, autogenously joined parallel contiguous inner faces formed on the chord of the airfoil, the outer faces of the joined marginal portions being shaped to form an airfoil edge of the blade.

16. A hollow steel aircraft propeller blade comprising a seamless tubular shank and face-sections integral with the shank having their outer faces of airfoil contour, the face-sections having, at one of their margins, autogenously joined parallel contiguous inner faces, the outer faces of the joined marginal portions being shaped to form an airfoil edge of the blade.

17. A hollow steel aircraft propeller blade comprising a tubular shank and integral face-sections having their outer faces of airfoil contour, one of the face-sections having both of its marginal portions of substantially the same wall-thickness and a longtiudinally extending zone of reduced wall-thickness between its marginal portions, the face-sections having, at one of their margins, autogenously joined parallel contiguous inner faces, the outer faces of the marginal joined portions being shaped to form a working edge of the blade.

18. A hollow steel aircraft propeller blade comprising a tubular shank and face-sections having their outer faces of airfoil contour, the face-sections having at one of their margins a strip with faces parallel, and contiguous, and autogenously joined, to the inner faces of said margin of the sections, the outer faces of said strip and joined marginal portions being shaped to form an airfoil edge of the blade.

19. A hollow steel aircraft propeller blade comprising a seamless tubular shank and face-sections integral with the shank, having their outer faces of airfoil contour, the face-sections having at one of their margins a strip with faces parallel, and contiguous, and autogenously joined, to the inner faces of said margin of the sections, the outer faces of said strip and the joined marginal portions being shaped to form an airfoil edge of the blade.

20. A hollow steel aircraft propeller blade comprising a tubular shank and face-sections having their outer faces of airfoil contour, the face-sections having at one of their margins a strip with chordal faces parallel, and contiguous, and autogenously joined, to the inner faces of said margin of the sections, the outer faces of said strip and joined marginal portions being shaped to form an airfoil edge of the blade.

GLEN T. LAMPTON.